US006698821B2

(12) United States Patent
Racz

(10) Patent No.: US 6,698,821 B2
(45) Date of Patent: Mar. 2, 2004

(54) VEHICLE DOOR MOUNTING

(75) Inventor: Nikolaus G. Racz, Greensboro, NC (US)

(73) Assignee: Volvo Trucks North America, Inc., Greensboro, NC (US)

(*) Notice: Subject to any disclaimer, the term of this patent is extended or adjusted under 35 U.S.C. 154(b) by 240 days.

(21) Appl. No.: 09/898,803

(22) Filed: Jul. 3, 2001

(65) Prior Publication Data

US 2003/0006628 A1 Jan. 9, 2003

(51) Int. Cl.$^{7}$ .......................... B62D 25/00; E05D 7/12
(52) U.S. Cl. ..................... 296/202; 296/146.11; 16/254
(58) Field of Search ........................... 296/146.11, 202; 16/254, 270

(56) References Cited

U.S. PATENT DOCUMENTS

| | | | | |
|---|---|---|---|---|
| 546,909 | A | * | 9/1895 | Spencer |
| 565,983 | A | * | 8/1896 | Held |
| 3,677,259 | A | | 7/1972 | Doner |
| 4,619,016 | A | * | 10/1986 | Brockhaus |
| 4,628,567 | A | | 12/1986 | Brockhaus et al. |
| 4,860,424 | A | | 8/1989 | Kaibuki et al. |
| 4,864,689 | A | | 9/1989 | Brockhaus |
| 5,038,436 | A | | 8/1991 | Ihrke |
| 5,054,165 | A | * | 10/1991 | Marchione |
| 5,095,582 | A | * | 3/1992 | Ohlsson |
| 5,624,150 | A | * | 4/1997 | Venier |
| 5,924,170 | A | | 7/1999 | Papke et al. |
| 5,987,703 | A | | 11/1999 | Kluting et al. |
| 6,038,740 | A | * | 3/2000 | Hoger et al. |
| 6,122,819 | A | | 9/2000 | Roy et al. |
| 6,158,087 | A | | 12/2000 | Cheung |
| 6,178,599 | B1 | | 1/2001 | Worden et al. |

FOREIGN PATENT DOCUMENTS

| | | | |
|---|---|---|---|
| EP | 1 055 787 | A1 | 11/2000 |
| JP | 63265787 | A | 11/1988 |
| JP | 04331625 | A | 11/1992 |
| JP | 11182122 | A | 7/1999 |

* cited by examiner

*Primary Examiner*—Joseph D. Pape
(74) *Attorney, Agent, or Firm*—Watts Hoffman Co., LPA

(57) ABSTRACT

A vehicle having an occupant space within a cab is disclosed. The cab has an access door providing access to the space. The door includes a novel hinge mounting construction including a hinge mounting plate. The plate is moveable over a limited adjustment range. A hinge plate locator sized to mate with complemental surfaces of a hinge leaf is provided. The locator is connected to the plate and moveable with the plate as the plate is moved within its adjustment range. A fastener is provided to fix the locator and plate in an adjusted position such that the door may be removed and remounted without repeating an initial locating adjustment.

33 Claims, 2 Drawing Sheets

VEHICLE DOOR MOUNTING

TECHNICAL FIELD

This invention relates to vehicles and more specifically to a method and apparatus for mounting vehicle doors.

BACKGROUND OF THE INVENTION

In vehicle manufacture, doors are frequently mounted on a vehicle body and adjusted to provide a desired fit at a relatively early stage in the assembly operation. Once the door has been mounted and adjusted to provide a suitable fit, the door is removed for further processing. The further processing often includes applying a coat of finish. It also may include such further steps as mounting a window and window actuator, attaching a suitable lining, and mounting handles and an armrest.

With over the highway trucks, in the past doors have been mounted by connecting hinge leafs to so called nut plates disposed on the side of a mounting panel opposite a connected hinge leaf. Fasteners connecting the hinge leaf to the nut plate were left in a loosened condition while the door was manipulated to a desired adjusted position. Once in the desired position the fasteners were tightened to clamp the hinge leaf and nut plate to opposite sides of the mounting panel. If the door was removed for further processing or to facilitate a vehicle repair an operator then had to repeat the door adjustment positioning when the door was remounted. This was true because there has been no satisfactory mechanism for relocating doors in heavy duty vehicles such as class 8 over the highway trucks and tractors.

For service and repair within the cab of a heavy duty vehicle, there are occasions when door removal will greatly facilitate access to the site of the service or repair. In the past remounting of the door following such service or repair has required replication of the door adjustment performed during manufacture. Not only is such replication time consuming, it is seldom performed as well as the initial alignment during manufacture. This is because persons who align doors in manufacture do it repeatedly and if they do not do it well soon find themselves replaced by others. People who perform service and repair on vehicles on the other hand are selected for their repair skills, not their alignment skills, and do not have the benefit of repetitive opportunities to improve their skills.

Many vehicle and manufacturing processes and mechanisms have been proposed for facilitating relocation of a removed door in the adjusted position that had been achieved prior to door removal. The mechanisms that have been proposed are often complicated and typically are unsuited for use on heavy duty vehicles such as over the highway trucks and tractors. Moreover, many of the mechanisms used for relocating doors add weight to a vehicle. Every pound of weight added to an over the highway tractor reduces by one pound the lawful payload which can be transported with the tractor. When one considers that an over the highway tractor typically is operated for the order of 500,000 miles and that for many applications haulage charges are a function of the weight of a payload, a pound of vehicle weight translates into a loss of 250 ton miles of cargo over the life of the vehicle.

Accordingly it would be desirable to provide an inexpensive light weight system for facilitating the relocation of a door in an adjusted position after a door has been removed from a vehicle cab.

SUMMARY OF THE INVENTION

With a device made in accordance with a present invention, a locator is mounted on one side of a mounting panel and connected to a nut plate on the opposite side of the panel. The locator and the hinge leaf have complemental surfaces that fix the two in a constant relative position as positioning adjustment is made. The fastener connecting the locator is left in a loosened condition until the door has been moved to an adjusted position and the nut plate and hinge leaf have been clamped against opposite sides of the panel. The fastener securing the locator is then tightened to fix the locator in an adjusted position.

When a door is subsequently removed for further processing or for access to the cab during servicing and repair the fastener securing the locator in place is left untouched so that the locator is maintained in its adjusted position. When a door is remounted the hinge leaf is positioned to reengage the complemental surfaces of the hinge leaf and the locator thereby relocating the hinge leaf in the previously attained adjusted position. The mounting fasteners are then reinserted and tightened to complete the remounting of the door in its adjusted position. Preferably each hinge leaf of a set of hinges supporting a door is equipped with complemental surfaces that coact with an associated locator. Thus if there are upper and lower hinges an operator returning a door to its mounted position on a vehicle cab locates each hinge leaf by coaction with that hinge leaf's associated locator Accordingly the objects of the invention are to provide a novel and improved mechanism for facilitating removal and reinstallation of vehicle doors and a process of doing so.

DESCRIPTION OF THE PREFERRED EMBODIMENT

Figure 1:
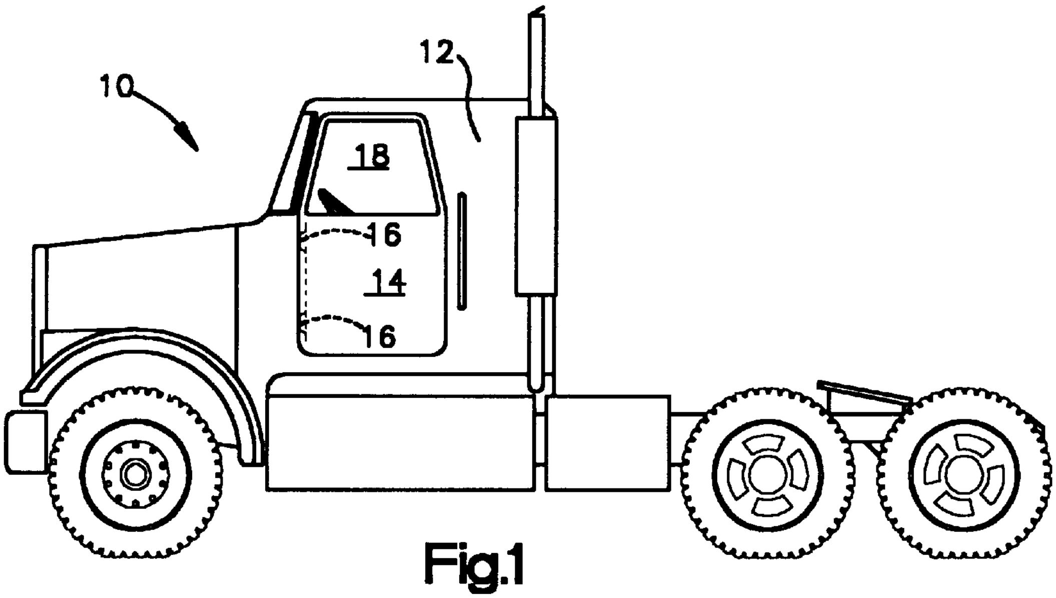
FIG. 1 is a somewhat schematic view of an over the highway truck or tractor.

Referring to the drawings and FIG. 1 in particular, an over the highway tractor is shown generally at 10. The tractor includes the usual cab 12 which is fitted with an access door 14. The door is mounted by a pair of hinges 16 which are positioned one above the other. As will be apparent and is well known, the door 14 provides access to an occupant's space 18 within the cab 12.

Figure 2:
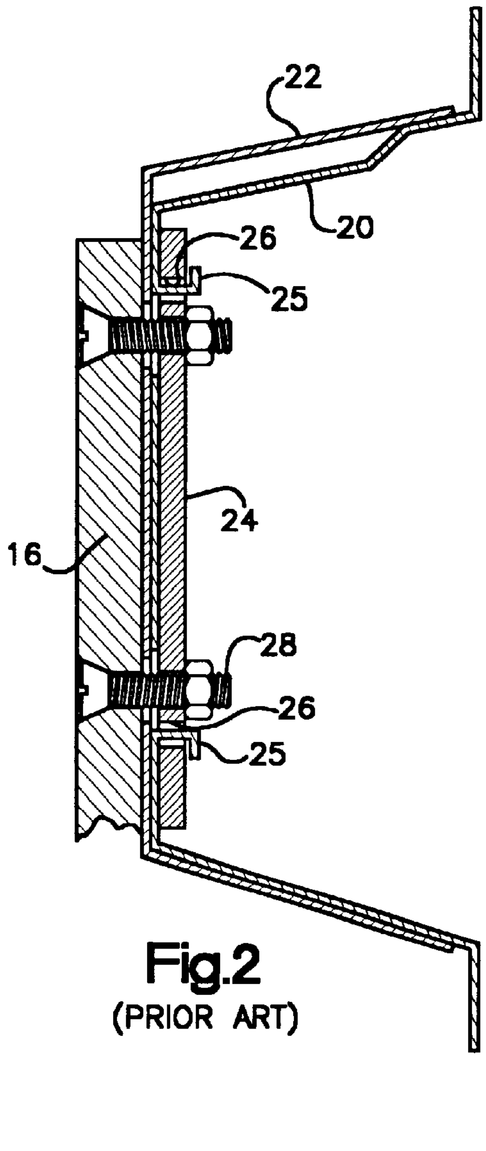
Fig.2 (PRIOR ART)
FIG. 2 is a sectional view showing a conventional and prior nut plate, hinge leaf and mounting panel.
Figure 4:
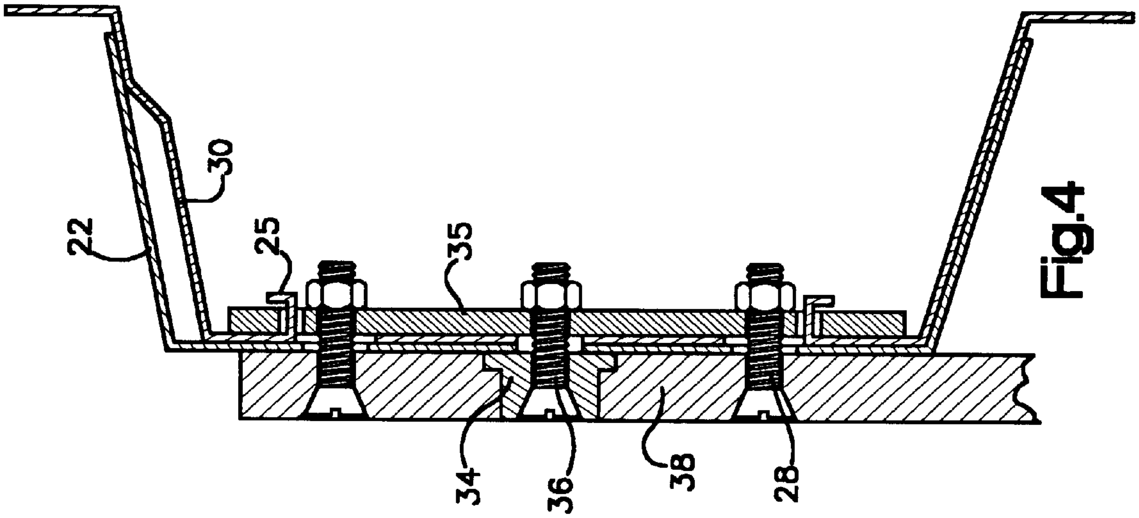
FIG. 4 is a sectional view showing the hinge arrangement of the present invention in a door mounted condition.
Figure 3:
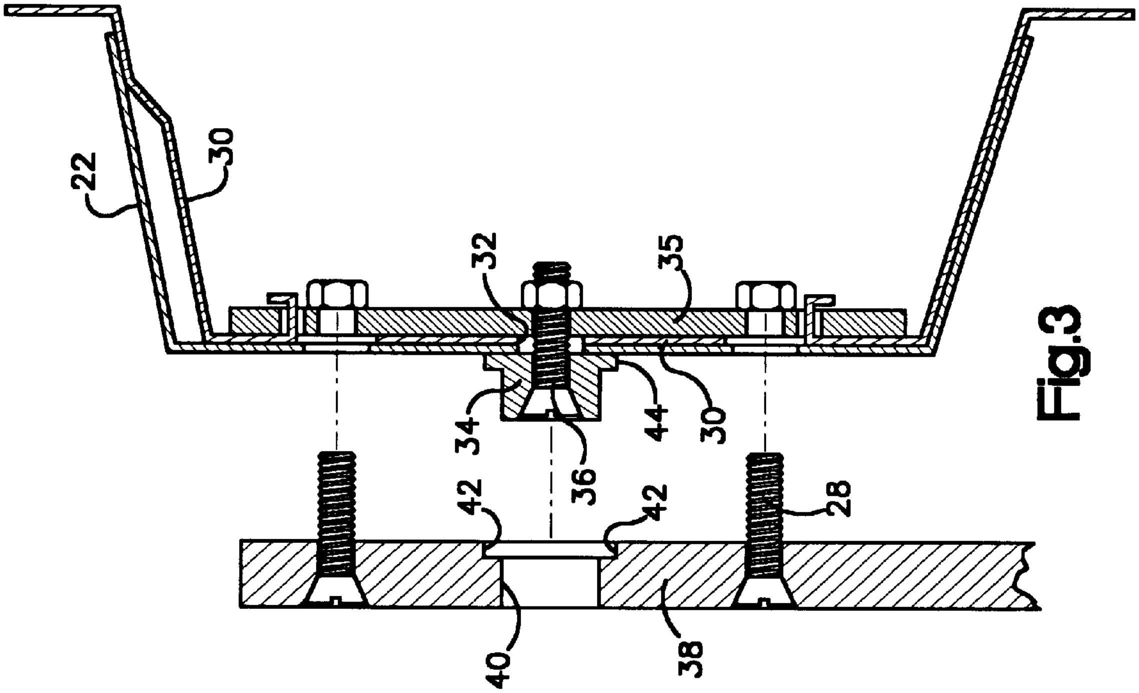
FIG. 3 is an exploded sectional view showing the improved leaf and locator of the present invention as the leaf is being removed from, or returned to, its mounted position on the panel.

Referring now to FIGS. 2–4 a mounting post 20 is provided. As may be seen by examination of FIGS. 2–4, the mounting post is an interior structure hidden by an external body panel 22. With the prior art as shown in FIG. 2 a nut plate 24 is mounted on the mounting post 20 and maintained in a connected relationship by mounting clips 25. The clips 25 project through nut plate apertures 26 which surround the clips in space relationship. Thus while the hinge mounting plate in the form of a nut plate 24 is connected to the post 20, it is moveable with respect to the post over an adjustment range. The adjustment range of the nut plate permits the nut plate and the hinge 16 to be moved for adjustment positioning. Once the hinge and leaf are in a desired position they are secured in place by tightening fasteners 28.

Referring now to FIGS. 3 and 4 a modified mounting post 30 is provided. The modified post 30 differs from the post 20 in that a locating aperture 32 is provided. A locator 34 is connected to a modified nut plate 35 by a fastener 36 coacting with a nut 37 welded to the plate 35. Thus the locator 34 is connected to the modified nut plate 35 such that the locator will move with the modified nut plate as the modified nut plate is moved through its range of adjustment.

A hinge leaf 38 is shown in FIGS. 3 and 4. The hinge leaf includes a through bore 40 of cylindrical configuration. A circular counterbore 42 is formed on the mounting post side of the hinge leaf plate 38 in axial alignment with the bore 40. The cylindrical surfaces of the bore 40 and counterbore 42 are complemental with corresponding surfaces 44 of the locator 34. Thus, when the hinge leaf 38 is mounted over the locator 34 as shown in FIG. 4, the hinge plate and locator are in a fixed relative position. The fastener 36 fixes the nut plate and the locator in an adjusted position by clamping them against opposed surfaces of the post 30. The fasteners 28 fix the hinge leaf to the nut plate when the vehicle is in condition for use for its intended purpose.

Operation

In mounting a door an operator first makes sure that the fastener 36 is loose in order that the locator 34 and the connected nut plate 35 are free to move throughout their common adjustment range. A door is then positioned for mounting to close the access opening to the occupant space 18. Each hinge leaf 38 is manipulated until the associated locator 34 projects into the through bore 40 and the counter bore 42. The bolts 38 are connected to the nut plate 35 and left in a loosened condition in order that the hinge plate, nut plate and locator may be moved in unison through the adjustment range relative to the post 30 until located in the desired position. Once the door is located in the desired position the locator fastener 36 and the hinge fasteners 28 are tightened to secure the door in its adjusted position.

Once it is determined that the door has been appropriately positioned for both appearance and aerodynamics the door is removed for further processing such as by adding finish and installing a window and its elevating mechanism. The door removal is accomplished by disconnecting the hinge fasteners 28 from the nut plate while the locator fastener 36 is maintained in its tightened condition so that the nut plate and locator remain fixed relative to the mounting post 30.

When the door is to be reinstalled an operator simply aligns each hinge leaf 38 with its associated locator 34 and positions the leaf such that the locator projects into the bore 40. The hinge fasteners 28 are reconnected to the nut plate 35 and tightened.

Should a service person wish to enhance access to the occupant space 18 that person simply disconnects the fasteners 28 from the nut plate 35 and removes the door. The locator fastener 36 is maintained in its tightened condition in order that the nut plate 35 and the locator 34 remain clamped against the post 30 to maintain their adjusted positions. The reinstallation of the door following the service is the same as the reinstallation during manufacture. One simply positions the door such that the locators 34 each project into the bore and counter bore 40, 42 of an associated hinge leaf 38.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

What is claimed is:

1. A vehicle having an occupant space and an access door providing access to the space, a hinge mounting construction comprising:

a) a hinge mounting plate carried by the vehicle, the plate being moveable over a limited adjustment range;

b) a hinge plate locator sized to mate with a complemental surface of a hinge leaf;

c) the locator being connected to the plate and moveable with the plate as the plate is moved within its adjustment range; and d) a fastener that connects the locator and plate to fix the locator and plate in an adjusted position relative to the vehicle.

2. The mounting construction of claim 1 wherein the plate is a nut plate having a plurality of spaced nuts, one of the nuts being a part of said fastener.

3. The mounting construction of claim 1 wherein the locator has a locator surface and the locator and complemental surfaces are circular in cross-section.

4. The mounting construction of claim 3 wherein the surfaces are cylindrical.

5. In an motor vehicle having a cab equipped with an access door an improved door mounting arrangement comprising:

a) the cab including a door post;

b) a hinge mounting plate connected to the post for movement over a range of adjustment;

c) a door hinge having a leaf mounted on the post with a section of the post between the plate and the leaf;

d) removable fasteners connecting the plate and leaf together and clamping the leaf and plate against the post to secure the plate and leaf in an adjusted position;

e) a leaf locator having a leaf locating section;

f) a clamp mechanism operably connected to the locator and the plate for fixing the locator and the plate in an adjusted position relative to the door post; and g) the leaf and locator having complemental leaf locating surfaces whereby upon removal of the removable fasteners, the leaf can be removed from engagement with the locator and thereafter returned to an adjusted position by coaction of the complemental surfaces.

6. The arrangement of claim 5 wherein there are a pair of hinges and a pair of hinge mounting plates.

7. The arrangement of claim 6 wherein there are two locators, each associated with a respective one of the leafs.

8. The arrangement of claim 5 wherein the vehicle is a selected one of an over the highway truck and an over the highway tractor.

9. The arrangement of claim 5 wherein there are a plurality of nuts fixed to the plate and the plate is an apertured plate, the removable fasteners being threaded bolts.

10. The arrangement of claim 5 wherein the clamp mechanism includes a threaded bolt.

11. A process of mounting and remounting a door comprising:

a) loosely connecting a locating member to a mounting member;

b) connecting a door hinge leaf to the mounting member such that a complemental surface of the hinge leaf is disposed around the locating member;

c) moving the leaf and mounting member relative to a mounting post to locate the leaf, locating member and mounting member in a desired position relative to the post;

d) tightening the connection between the locating member and the mounting member to fix the locating member and the mounting member in the desired position relative to the post;

e)disconnecting the leaf from the mounting member to remove the leaf and a connected door from the post, while leaving the locating member and the mounting member connected to the post in the desired position relative to the post;

f) returning the door to the desired position by placing the complemental surface of the hinge leaf around the locating member to relocate the leaf in the desired position; and g) fixing the leaf to the mounting member to secure the leaf in the desired position.

12. The process of claim 11 wherein there are upper and lower hinges each having amounting leaf and steps a through g are performed with each mounting leaf.

13. The process of claim 12 wherein the complemental surfaces are circular in cross section.

14. The process of claim 13 wherein the complemental surfaces are cylinders.

15. The process of claim 11 wherein the door is an access door to a vehicle cab.

16. The process of claim 15 wherein the vehicle is a selected one of an over the highway truck and an over the highway tractor.

17. The process of claim 11 wherein the mounting member is a nut plate and the leaf and locating member are secured to the nut plate by threaded fasteners.

18. The process of claim 11 wherein the locating member is circular in cross section.

19. The process of claim 18 wherein the locating member is cylindrical.

20. In an over the highway vehicle, the improvement comprising:

a) a vehicle cab including an occupant space and an access door to the space;

b) a spaced pair of hinges mounting the door on a cab post;

c) each of the hinges including a pair of leafs connected respectively to the door and the post; and d) at least one of the leaf connections of an associated one of said leafs including:

i) leaf fasteners connecting said one leaf to an adjustment member carried by the post;

ii) the adjustment member and said one leaf being moveable together relative to said post over an adjustment range when the leaf fasteners are loose to effect locating adjustment of the door relative the remainder of the cab, the leaf fasteners when tightened maintaining said one leaf and the adjustment member in an adjusted position;

iii) a hinge locator connected to the adjustment member by a locator fastener;

iv) the locator being moveable with the adjustment member over the adjustment range when the locator fastener is loose and being fixed relative to said post and fixing the adjustment member relative to the post when the locator fastener is tightened; and v) the locator and said one leaf having complemental surfaces whereby a door may be removed from and then returned to an adjusted position through coaction of the complemental surfaces.

21. The improvement of claim 20 wherein each of the hinges includes a leaf connected to an associated adjustment member and each leaf has an associated locator with complemental surfaces.

22. The improvement of claim 20 wherein the member is a nut plate.

23. The mounting of claim 20 wherein the locator has a locator surface which is circular in cross-section.

24. The mounting of claim 23 wherein the locator surface is cylindrical.

25. The arrangement of claim 20 wherein the vehicle is a selected one of an over the highway truck and an over the highway tractor.

26. A vehicle having an occupant space and an access door providing access to the space, a hinge mounting construction comprising:

a) a hinge mounting plate carried by the vehicle, the plate being moveable over a limited adjustment range;

b) a hinge plate locator sized to mate with a complemental surface of a hinge leaf fixedly connected to the door;

c) the locator being connected to the plate and moveable with the plate as the plate is moved within its adjustment range; and d) a fastener that connects the locator and plate to fix the locator and plate in an adjusted position relative to the vehicle wherein the door may be removed from the vehicle and then returned to an adjusted position on the vehicle by guiding the mating surface of the hinge leaf to the complemental surface of the locator which is fixed to the vehicle.

27. In a vehicle having an occupant space and an access door providing access to the space, a hinge mounting construction comprising:

a) a hinge mounting plate positioned on a first side of the mounting panel, the plate being moveable over a limited adjustment range;

b) a hinge plate locator positioned on an opposite side of the mounting panel, the locator being connected to the plate and moveable with the plate as the plate is moved within its adjustment range;

c) a door hinge leaf positioned such that a complemental surface of the hinge leaf is disposed around the locator;

d) a fastener that clamps the locator and plate to the mounting panel to fix the locator and plate in an adjusted position relative to the vehicle.

28. The hinge mounting construction of claim 27 wherein said mounting panel is a door mounting post.

29. The hinge mounting construction of claim 27 further comprising a plurality of nuts are fixed to the hinge mounting plate.

30. The hinge mounting construction of claim 27 wherein said locator remains attached to said vehicle when the door hinge leaf is removed from the vehicle.

31. A process of mounting and remounting a door comprising:

a) positioning a locator on a first side of a vehicle mounting panel;

b) positioning a mounting member on an opposite side of said mounting panel;

c) loosely connecting a locating member to the mounting member;

d) positioning a door hinge leaf such that a complemental surface of the hinge leaf is disposed around the locating member;

e) clamping the mounting member and the door hinge leaf against the sides of the mounting panel to fix the leaf and the mounting member in the desired position relative to the mounting panel;

f) tightening the connection between the locating member and the mounting member to secure the locating member and the mounting member in the desired position relative to the mounting panel;

g) disconnecting the leaf from the mounting panel to remove the leaf and a connected door from the vehicle, while leaving the locating member and the mounting member connected to the vehicle mounting panel in the desired position relative to the mounting panel;

h) returning the door to the desired position by placing the complemental surface of the hinge leaf around the locating member to relocate the leaf in the desired position; and i) fixing the leaf to the mounting member to secure the leaf in the desired position.

32. A process of mounting and remounting a door comprising:

a) positioning a locator on a first side of a mounting post;

b) positioning a mounting member on an opposite side of said mounting post;

c) loosely connecting a locating member to the mounting member;

d) positioning a door hinge leaf such that a complemental surface of the hinge leaf is disposed around the locating member;

e) moving the leaf and mounting member relative to the mounting post to locate the leaf, member and mounting member in a desired position relative to the mounting post;

f) clamping the mounting member and the door hinge leaf against the sides of the mounting post to fix the leaf and the mounting member in the desired position relative to the mounting post;

g) tightening the connection between the locating member and the mounting member to secure the locating member and the mounting member in the desired position relative to the mounting post;

h) disconnecting the leaf from the mounting panel to remove the leaf and a connected door from the post, while leaving the locating member and the mounting member connected to the post in the desired position relative to the post;

i) returning the door to the desired position by placing the complemental surface of the hinge leaf around the locating member to relocate the leaf in the desired position; and j) fixing the leaf to the mounting member to secure the leaf in the desired position.

33. The process of claim 32 wherein said fixing the leaf to the mounting member comprises threading fasteners into nuts that are fixed to said mounting member.

* * * * *